Patented Feb. 6, 1951

2,540,982

UNITED STATES PATENT OFFICE 2,540,982

PREPARATION OF 2-THENOYLACETO-NITRILES

William S. Emerson and Tracy M. Patrick, Jr., Dayton, Ohio, assignors to Monsanto Chemical Company, St. Louis, Mo., a corporation of Delaware No Drawing. Application February 10, 1948, Serial No. 7,523

5 Claims. (Cl. 260—329)

The present invention relates to the preparation of 2-thenoylacetonitriles.

A satisfactory method for the preparation of these compounds has not heretofore been available. While 2-thenoylacetonitrile has been prepared by the decomposition of 5-α-thienyl-3-carboxyl-isoxazole in accordance with the equation:

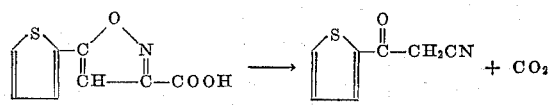

(Salvatori, Gazz. chim. ital. 21, II, 284 (1891)) this method is expensive and cumbersome.

In accordance with the present invention it has been found that 2-thenoylacetonitriles may be conveniently prepared by reacting an ω-chloro-2-acetothienone with a salt of hydrocyanic acid. The use of the chloro- instead of the more reactive bromo-derivatives decreases the quantity of by-products which accompany the desired product. The reaction may be represented by the equation:

T represents a 2-thienyl- radical, as for example 5-chloro-2-thienyl-, 5-bromo-2-thienyl-, 5-fluoro-2-thienyl-, 5-iodo-2-thienyl- or 5-methyl-2-thienyl-. M represents an inorganic salt forming group, as for example ammonium or alkali metal.

For best results the reaction is carried out in a medium in which both reactants are at least partially soluble. Alcohol, water, ethylene glycol and mixtures thereof are satisfactory. Preferably a salt of hydrocyanic acid is selected which has a perceptible solubility in the reaction medium employed.

The following examples are specific embodiments of the invention and are to be taken as illustrative, not limitative thereof.

EXAMPLE I

2-thenoylacetonitrile

To a cold solution of 13.0 g. of potassium cyanide in 40 cc. of water was added with shaking a solution of 16.1 g. of ω-chloro-2-acetothienone in 50 cc. of ethanol. The ketone immediately precipitated. The mixture was allowed to stand for one hour with occasional shaking, during which time the maximum temperature was 33°. Water was then added to incipient turbidity followed by a few drops of 10% sodium hydroxide. After the mixture was twice extracted with small portions of benzene, Norit was added and the solution was filtered. The filtrate was cooled in ice and carefully acidified with cold 3 N hydrochloric acid. The precipitated 2-thenoylacetonitrile was separated by filtration, washed with cold water and dried in a vacuum desiccator over phosphorous pentoxide. It weighed 9.0 g. (60% yield), M. P. 120–128°. An analytical sample, after several crystallizations from ethanol, melted at 136–137°.

*Anal.*—Calcd. for $C_7H_5ONS$: N, 9.27. Found: N, 9.18.

EXAMPLE II

5-chloro-2-thenoylacetonitrile

To a solution of 4.9 g. of potassium cyanide in 30 cc. of water, cooled by an ice bath, there was added a solution of 7.0 g. of 5, ω-dichloro-2-acetothienone in 75 cc. of ethanol. The resulting suspension was removed from the ice bath and shaken. The temperature was kept below 30° by occasional cooling. After thirty minutes, when solution was complete, the flask was placed in the refrigerator overnight. The mixture was diluted with 45 cc. of water to incipient turbidity, treated with a few drops of 10% sodium hydroxide and extracted three times with small portions of benzene. The aqueous solution was treated with Norit (an activated carbon) in the cold, filtered and acidified with 3 N hydrochloric acid. The light brown crystals which precipitated were separated by filtration, washed with cold water, and dried in vacuo over potassium hydroxide. This crude product weighed 4.9 g. (73% yield), M. P. 108–114°. After four recrystallizations from ethanol, in two of which the solution was treated with Norit (an activated carbon), an analytical sample, comprising white crystals, melted at 120°.

*Anal.*—Calcd. for $C_7H_4ONSCl$: Cl, 19.1. Found: Cl, 18.9.

The present invention is limited solely by the claims attached hereto as part of the present specification.

What is claimed is:

1. The method of making a 2-thenoylacetonitrile which comprises reacting an ω-chloro-2-acetothienone with a salt of hydrocyanic acid.

2. The method of making a 2-thenoylacetonitrile which comprises reacting an ω-chloro-2-acetothienone with a soluble salt of hydrocyanic acid.

3. The method of making a 2-thenoylacetonitrile which comprises reacting an ω-chloro-2-acetothienone with an alkali metal cyanide.

4. The method of making 2-thenoylacetonitrile which comprises reacting ω-chloro-2-acetothienone with an alkali metal cyanide.

5. The method of making 5-chloro-2-thenoylacetonitrile which comprises reacting 5, ω-dichloro-2-acetothienone with an alkali metal cyanide.

WILLIAM S. EMERSON.
TRACY M. PATRICK, Jr.

REFERENCES CITED

The following references are of record in the file of this patent:

Obregia: Ann. 266, 325–326 (1891).

Richter: "Organic Chemistry," pp. 649–650, Wiley, N. Y., 1938.